June 23, 1936.   W. OGILVIE   2,045,486
MULTISPINDLE AUTOMATIC LATHE OR LIKE MACHINE
Filed Sept. 3, 1935   3 Sheets-Sheet 1

INVENTOR
WILLIAM OGILVIE.
BY Norris & Bateman
ATTORNEYS

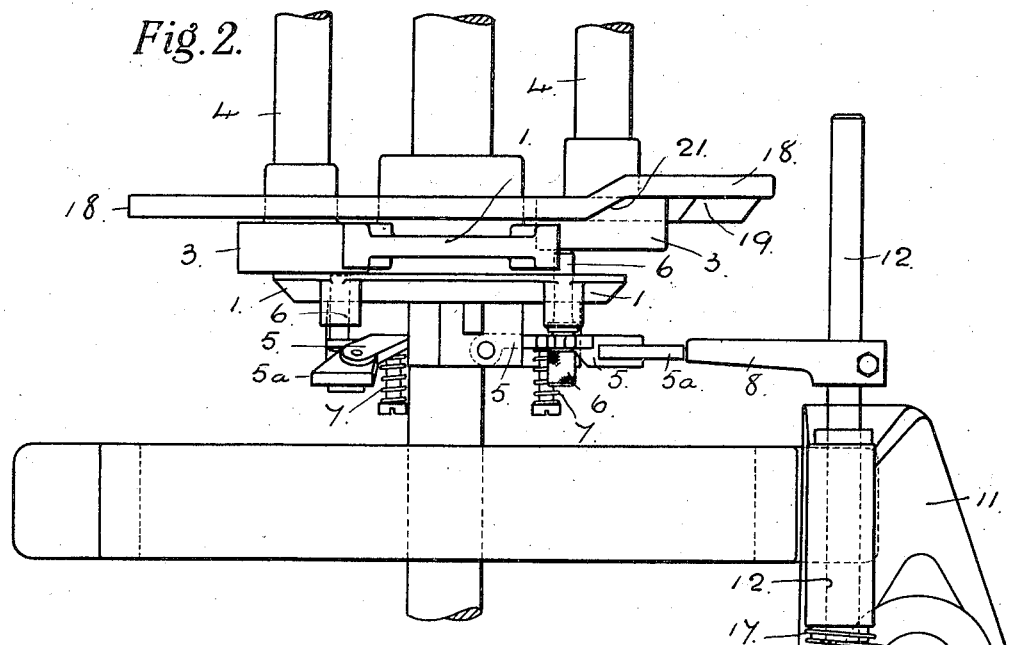
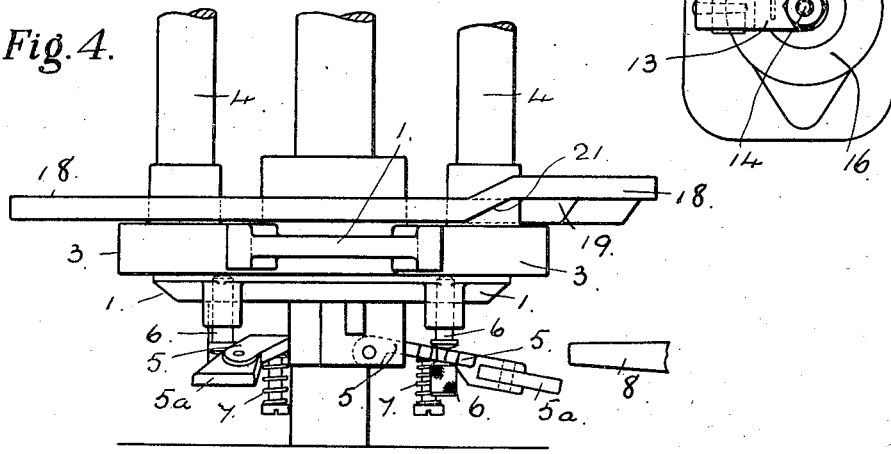

June 23, 1936.  W. OGILVIE  2,045,486
MULTISPINDLE AUTOMATIC LATHE OR LIKE MACHINE
Filed Sept. 3, 1935   3 Sheets-Sheet 3

INVENTOR
WILLIAM OGILVIE.
BY Norris & Bateman
ATTORNEYS

Patented June 23, 1936

2,045,486

UNITED STATES PATENT OFFICE 2,045,486

MULTISPINDLE AUTOMATIC LATHE OR LIKE MACHINE

William Ogilvie, Knowle, England, assignor to B. S. A. Tools Limited, Birmingham, England, a British company Application September 3, 1935, Serial No. 39,008
In Great Britain May 3, 1935

3 Claims. (Cl. 29—37)

This invention relates to multi-spindle automatic lathes or like machines of the type wherein a number of work spindles are mounted in a spindle carrier which is revolubly supported in the head of the machine and intermittently rotated through part of a complete revolution, in synchronism with the timing of a longitudinally movable tool slide carried on a central shaft of the aforesaid spindle carrier, and transversely movable tool slides are mounted on or adjacent to the head of the machine, and wherein the tools are arranged to operate on bar stocks, whereby a completely machined article is produced at each part of a revolution of the spindle carrier.

In machines of the aforesaid kind, when the bar stock carried in any one of the hollow spindles of the revolving head runs out, it is necessary to stop the machine for the insertion of a fresh bar stock, but as such machines are adapted to run at high speed, whereby a completed component can be produced in a few seconds, it is therefore necessary for the attendant to carefully watch for the running out of a bar stock, to avoid breakage of tools or a complete jamming, which, as is well known, may be caused when the last end of the bar stock is not long enough to produce another component.

The object of the present invention is to provide means whereby the machine or its feed mechanism can be automatically stopped, when any one of the bar stocks runs out, that is, if the bar stock is of insufficient length to produce another component.

The invention consists in the provision of means arranged to operate in conjunction with the bar stock feeding mechanism, whereby when there is not a sufficient length of bar stock left for another component, an electric switch is mechanically operated to interrupt the functioning of the machine as by cutting out the driving motor of the machine, or making operative an electrical device for cutting out the feed mechanism.

I will now describe the invention as applied to a multi-spindle automatic lathe, wherein the pusher tubes, which are slidably mounted in the hollow spindles of the intermittently revoluble spindle carrier and carry the bar stock, have spools thereon arranged to engage in their outward position with a spider or pusher tube spool guard mounted on the central shaft of the spindle carrier, in which they are normally held by the grip of a collet or feed fingers on the front end of the pusher tube, and wherein the pusher tubes are moved outward by means of a feed ring which may be actuated by a cam, and are returned to their inward position by a spring or other suitable means. The aforesaid feed ring is also adapted to constitute means for guiding the spool on the end of each pusher tube into a groove formed in a longitudinally slidable shoe actuated by a feeding cam, and located at the last or finishing station, whereby the bar stock, from which the finished component has been removed by a parting tool is then fed forward against a stop, ready for the series of operations as it is intermittently rotated to the first and succeeding stations by the spindle carrier.

One form of the invention will now be described with reference to the accompanying drawings, in which:—

Figures 2 and 3 show respectively on an enlarged scale a plan view and an end elevation of the stop mechanism in its operative position, when one of the bar stocks has run out.

Figure 4 is a similar view to that of Figure 2, but showing the mechanism moved to its normal or inoperative position.

Figure 1:
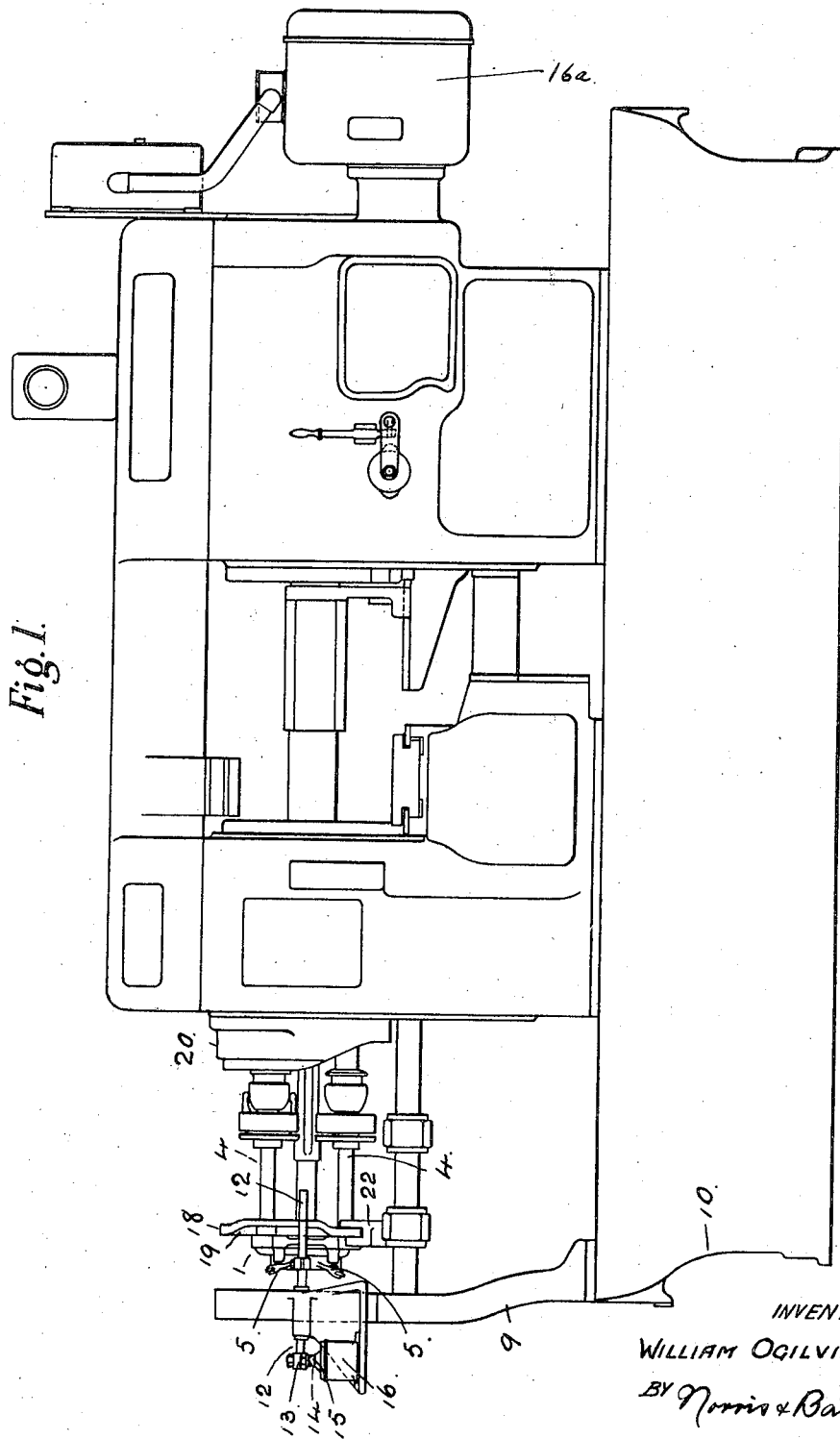
Figure 1 is a front elevation of a multi-spindle automatic lathe, provided with automatic stop mechanism in accordance with this invention.
Figure 3:
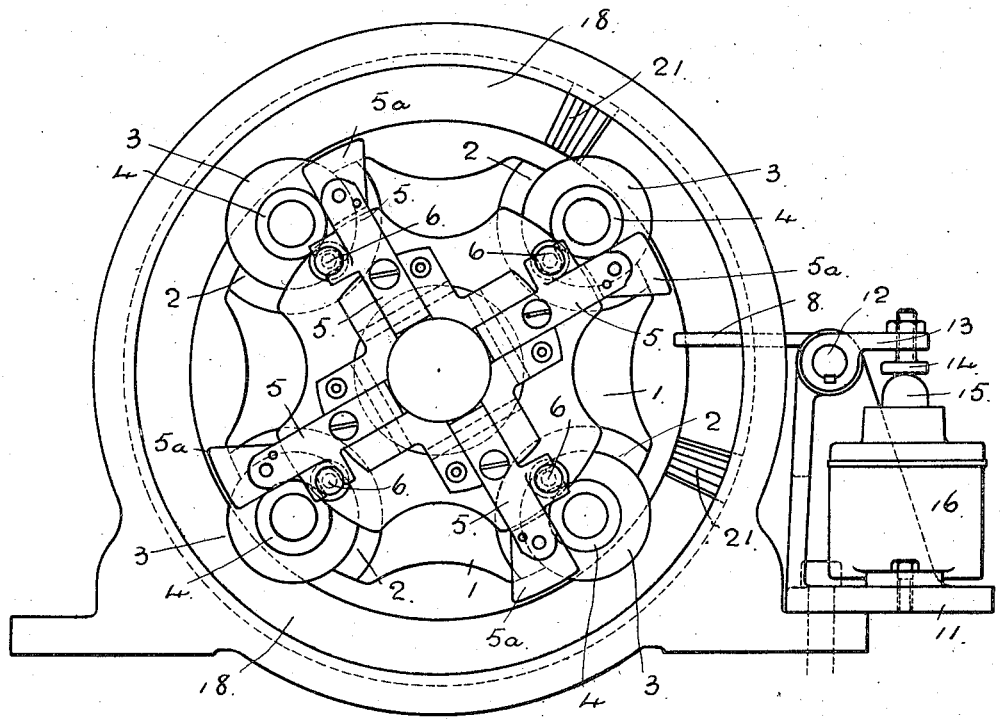

According to one practical mode of carrying the invention into effect, in its application to a multi-spindle lathe of the kind as before described, on the outer face of the spider or pusher tube spool guard 1, in alignment with each part circular recess 2 therein arranged to receive and support the spools 3 of the pusher tubes 4, I mount a hinged spring loaded finger 5 which is connected to a peg or projection 6 arranged to pass slidably through a hole formed in a boss on the said guard 1 and engage with the end of the spool 3 of the pusher tube 4, which latter normally moves and holds the finger in an outward position against the pressure of its loading spring 7, as seen in Figure 4, when the pusher tubes 4 are loaded with bar stock, but when a bar stock has been reduced to a length which is insufficient to produce another component, it has passed clear of the feed fingers in the pusher tube 4 containing same which is then free to be moved inward under the action of the spring loaded finger 5, as seen in Figure 2, to permit of the latter assuming an inward or operative position for engagement with a trip lever 8 arranged to actuate a switch or the like for automatically stopping the machine.

In one convenient arrangement I mount on the end frame or standard 9 which is fixed on the bed 10 of the machine, a bracket 11 in which is carried a rocking shaft 12 on which is adjustably mounted the trip lever 8, and on the outer end of the said rocking shaft is fixed an arm 13 in which is adjustably mounted a contact member 14 arranged to engage with and depress a knob 15 of an electric switch 16, whereby a motor 16a arranged to drive the machine is stopped, or the said switch may be in an electric circuit arranged to energize a solenoid adapted to release the clutch of the feed mechanism of the machine. The trip mechanism is moved to and held in its normal or inoperative position clear of engagement with the switch 16 by any suitable form of spring, which in one convenient arrangement may comprise a spring 17 mounted on the rocking shaft 12 and engaging the switch operating arm 13 fixed thereto.

To permit of the inward movement of the pusher tube 4 when only a short piece of bar stock remains, which is not of sufficient length to produce another component, and has therefore passed clear of the feed fingers, the feed ring 18 which engages with the end face of the spool 3 on the pusher tube 4 has formed in the face thereof a depression 19 located adjacent to the first and second stations of the spindle carrier 20, which is adapted to permit of a short inward movement of the pusher tube 4 under the action of the spring loaded finger 5, whereby a projection 5a mounted on the end of the latter moves into the position for engagement with the trip lever 8 of the electric switch device, during the intermittent rotation of the spindle carrier.

At each end of the depression 19 in the feed ring 18 is formed an inclined lead 21 which facilitates the slight outward movement of the pusher tube 4 for the purpose previously described, and ensures the return of same into engagement with the outer or working face of the feed ring 18, which then acts as a guide to lead the spool 3 of the freshly loaded pusher tubes 4 into a longitudinally slidable shoe (not shown) which is carried on a longitudinally slidable bracket 22, engaging with the feed ring 18, the said shoe being located at the feeding station, and adapted in known manner to feed the bar stock up to a suitable stop, after the finished component has been cut off and the chuck released, for which purpose the pusher tube 4 is provided in known manner at its inner end with a spring collet which grips the bar stock so as to carry it forward up to and against the stop, when it is again gripped by the chuck, and the pusher tube returned to its outward position, in which latter movement the collet on the pusher tube slides along the bar stock.

Having thus described my invention, what I claim as new and desire to secure by Letters Patent is:—

1. In multi-spindle automatic lathes and similar machines of the kind herein described having a shaft carrying an intermittently revoluble carrier, a plurality of hollow work spindles mounted in said carrier, pusher tubes slidably mounted in said work spindles and adapted to carry bar stocks, a spider fixed on the shaft of said carrier and supporting said pusher tubes in their outward position, a stop, and means for advancing one of said pusher tubes at the end of each complete revolution of said spindle carrier to feed the bar into contact with said stop, means for interrupting the functioning of the machine when any one of the bar stocks has run out, comprising spring loaded fingers hinged on the spider, and movable into an inoperative position by the pusher tubes when loaded with a sufficient length of bar stock and movable into an operative position when the length of the bar stock in any pusher tube is insufficient for another component, a trip mechanism arranged to be engaged by any one of the fingers when moved to the operative position, and an electric switch operative by said trip mechanism to interrupt the functioning of the machine.

2. A multi-spindle automatic lathe or like machine according to claim 1, including projections slidably carried in said spider and operatively connected to said spring loaded hinged fingers and engageable with the ends of the respective pusher tubes when the latter move to their outward position.

3. A multi-spindle automatic lathe or like machine according to claim 1, wherein said trip mechanism comprises a trip lever, a rock shaft on which said trip lever is adjustably mounted, and an arm fixed to said rock shaft and engageable with said electric switch to actuate it when the trip lever is engaged by one of the fingers.

WILLIAM OGILVIE.